United States Patent [19]
Schmitt, Jr.

[11] Patent Number: 5,710,485
[45] Date of Patent: Jan. 20, 1998

[54] NEON LAMP ASSEMBLY WITH RF NOISE SHIELD

[75] Inventor: Robert J. Schmitt, Jr., Raymond, N.H.

[73] Assignee: Osram Sylvania Inc., Danvers, Mass.

[21] Appl. No.: 557,788

[22] Filed: Nov. 13, 1995

[51] Int. Cl.$^6$ ..................................... H01J 17/16
[52] U.S. Cl. .................. 313/634; 313/592; 313/313; 362/256
[58] Field of Search .................. 313/634, 313, 313/592, 239, 113; 174/35; 315/85; 362/84, 256; 116/42

[56] References Cited

U.S. PATENT DOCUMENTS

| | | |
|---|---|---|
| 3,801,808 | 4/1974 | Johnson . |
| 4,682,146 | 7/1987 | Friedman, III ........................ 116/42 |
| 5,287,258 | 2/1994 | Remus ................................ 313/313 |

Primary Examiner—Sandra L. O'Shea
Assistant Examiner—Joseph Williams
Attorney, Agent, or Firm—William E. Meyer

[57] ABSTRACT

A neon lamp assembly includes a housing having a cavity with an aperture for emission of light, a neon lamp mounted within the cavity in the housing for emission of light through the aperture and a lens covering the aperture in the housing. Connectors are secured to opposite ends of the neon lamp. Each connector includes a resilient boot that is positioned in a recess in the housing. The resilient boot locates the lamp in the housing and cushions the lamp against shock and vibration. The neon lamp assembly further includes a light-transmissive, conductive mesh covering the aperture in the housing for substantially blocking the emission of RF energy from the housing, and an electrical conductor for coupling the conductive mesh to a reference potential, such as ground. The neon lamp is typically used as a stop light in a vehicle.

19 Claims, 4 Drawing Sheets

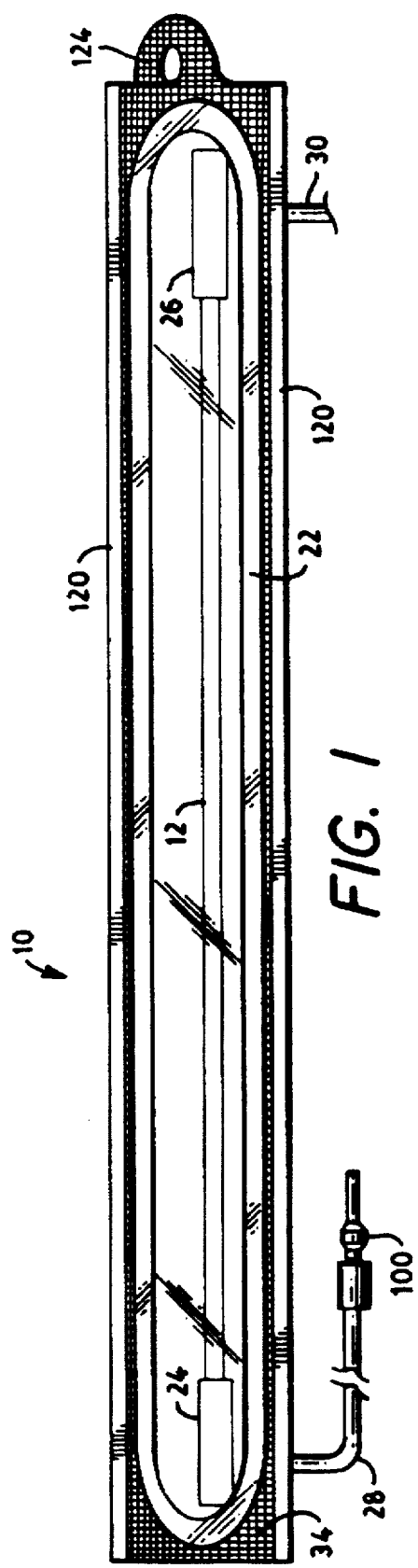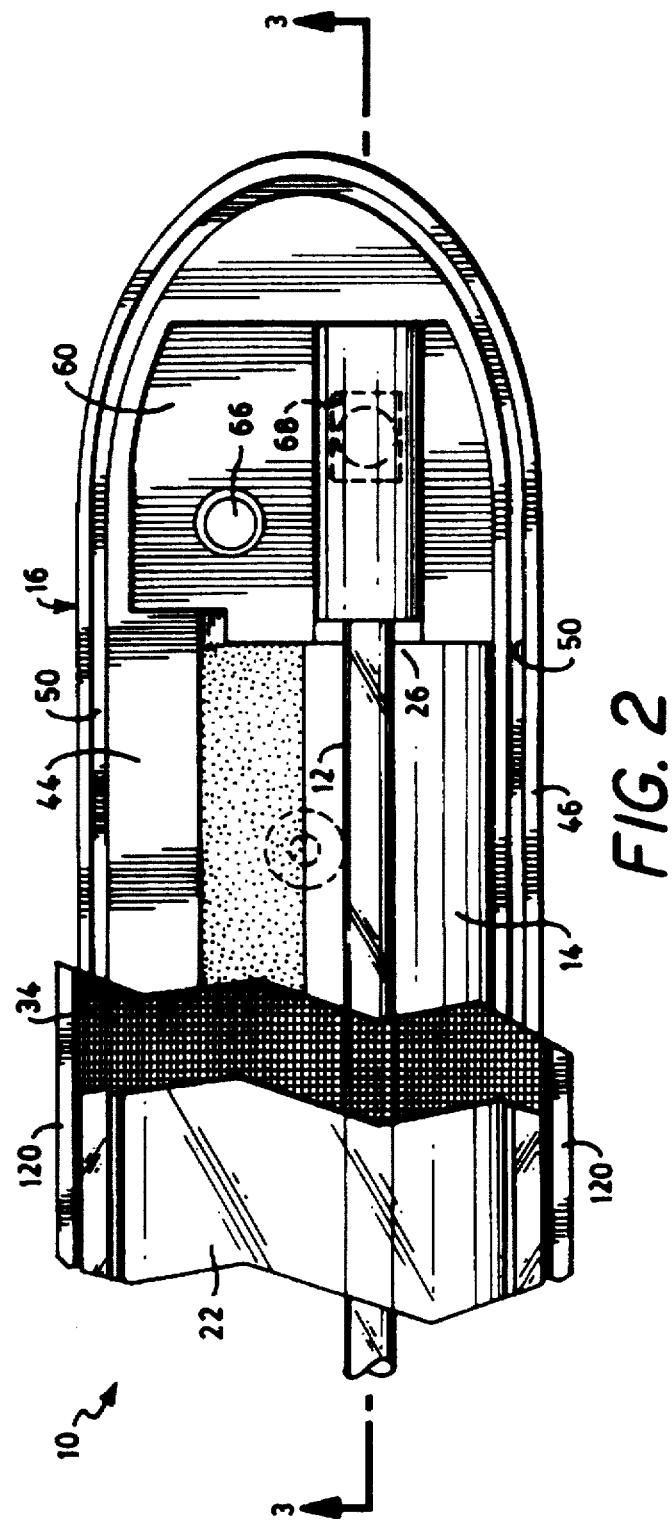

NEON LAMP ASSEMBLY WITH RF NOISE SHIELD

Basic aspects of this invention are disclosed in copending application titled "Lamp Assembly With Resilient Connector For Locating And Cushioning Neon Lamp," Ser. No. 08/328,635 (issued as U.S. Pat. No. 5,615,472 filed by the present Applicant, Robert J. Schmitt Jr., on Oct. 25, 1994, and the benefit of the filing date of that application is hereby claimed for this Application.

FIELD OF THE INVENTION

This invention relates to neon lamp assemblies designed for use in vehicles and, more particularly, to neon lamp assemblies wherein the light-transmitting aperture is covered with a conductive mesh that substantially blocks emission of RF radiation generated within the lamp assembly.

BACKGROUND OF THE INVENTION

It has become customary in automobiles and other vehicles to utilize a stop/brake light which is located high on the rear of the vehicle and is centered for improved visibility. The stop light may, for example, be located in the rear window. In sport-utility vehicles which have a tailgate, the stop light may be located above the rear window. Such stop lights are typically elongated and may be twenty or more inches long. In order to achieve uniform illumination over this length, neon lamps may be used. In general, neon lamps have relatively low power consumption and long operating lives.

It has been proposed in the prior art to use neon lamps for signaling in vehicles. A neon lamp direction signal, including arrows for indicating direction, is disclosed in U.S. Pat. No. 1,792,599 issued Feb. 17, 1931 to Murray. The disclosed lamp also includes a stop signal indication. A neon sign, including a neon lamp tube for mounting in the window of an automobile, is disclosed in U.S. Pat. No. 1,854,654 issued Apr. 19, 1932 to Koch, Jr. et al. A neon lamp signaling device for mounting in the rear window of a vehicle is disclosed in U.S. Pat. No. 1,839,499 issued Jan. 5, 1932 to Rava. A rare gas automobile indicator light system employing a single, horizontally disposed indicator tube operated to provide braking, parking, emergency flasher and turn indications is disclosed in U.S. Pat. No. 4,682,146, issued Jul. 21, 1987 to Friedman, III.

A lamp assembly utilizing an elongated neon lamp tube must meet several requirements for successful application in vehicles. The neon lamp must be able to withstand a high level of shock and vibration without degradation in performance, particularly when it is mounted in a sport-utility vehicle that may be used in rough terrain. The lamp assembly must operate without interruption under high and low temperature conditions that result from the environment and from heat generated by the neon lamp. Furthermore, the lamp assembly must be protected against moisture and high humidity conditions. In addition, neon lamp assemblies for use in vehicles should be simple in construction and low in cost.

Neon lamps may be energized at a frequency on the order of 60 kHz. The starting voltage may be on the order of 3 kilovolts, and the operating voltage may be on the order of 1 kilovolt. It is important to ensure that the neon lamp assembly does not emit radiation which may potentially interfere with nearby electronic equipment in the vehicle, in other vehicles and in adjacent buildings. A pilot lamp fixture having a transparent conductive shield for reducing or eliminating RF interference is disclosed in U.S. Pat. No. 3,801,808, issued Apr. 2, 1974 to Johnson. A headlamp for motor vehicles, including a gas-discharge lamp, a glass or plastic screen and a metallic coating for shielding interference radiation, is disclosed in U.S. Pat. No. 5,287,258, issued Feb. 15, 1994 to Remus.

SUMMARY OF THE INVENTION

According to the present invention, a neon lamp assembly comprises a housing including a cavity with an aperture for emission of light, a neon lamp mounted within the cavity in the housing for emission of light through the aperture and conductors for coupling electrical energy to the neon lamp. The neon lamp assembly further comprises a light-transmissive, conductive mesh covering the aperture in the housing for substantially blocking the emission of RF energy from the housing, and an electrical conductor for coupling the conductive mesh to a reference potential, such as ground.

Typically, the neon lamp assembly includes a light-transmissive lens covering the aperture and the conductive mesh. The conductive mesh is preferably retained between the housing and the lens. Preferably, the housing includes a conductive surface which functions as a reflector for directing light emitted by the neon lamp through the aperture. The conductive surface and the conductive mesh enclose the neon lamp and substantially block emission of RF energy.

Preferably, the electrical conductor for coupling the conductive mesh to a reference potential comprises an integral extension of the conductive mesh external to the housing. The integral extension of the conductive mesh may be secured to a mounting stud on the lamp assembly for connection to ground. In a second embodiment, the electrical conductor comprises a wire, conductive tape or other conductor retained between the housing and the lens and electrically contacting the conductive mesh. In a third embodiment, the electrical conductor extends internally through the housing between the conductive mesh and an external grounding contact.

BRIEF DESCRIPTION OF THE DRAWINGS

For a better understanding of the present invention, reference is made to the accompanying drawings, which are incorporated herein by reference and in which:

FIG. 1 is a front view of the neon lamp assembly of the present invention;

FIG. 2 is a partial view of one end of the lamp assembly of FIG. 1, with the lens and conductive mesh cut away to show the interior of the lamp assembly;

DETAILED DESCRIPTION

Figure 3:
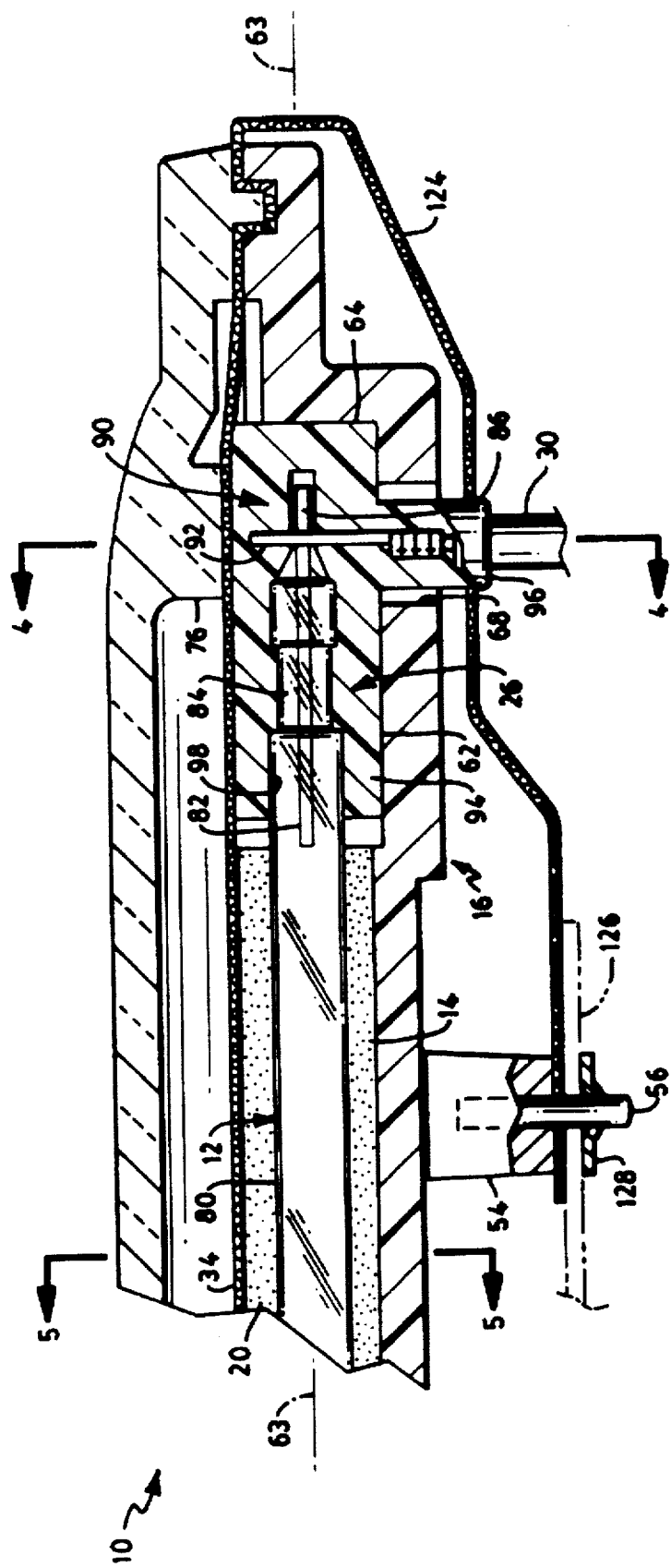
FIG. 3 is a cross-sectional view of one end of the lamp assembly, taken along the line 3—3 of FIG. 2.

A neon lamp assembly 10 in accordance with the present invention is shown in FIGS. 1–5. The lamp assembly 10 includes a neon lamp 12 mounted in a cavity 14 of a lamp housing 16. The cavity 14 has an open side, or aperture 20, for emission of light. The aperture 20 may be covered by a light-transmissive lens 22. The neon lamp 12 is supported at one end by a connector 24 and is supported at the opposite end by a connector 26. As described below, the connectors 24 and 26 have multiple functions in the lamp assembly. The connectors 24 and 26 include electrical leads 28 and 30, respectively, for connection of the neon lamp 12 to a suitable lamp power supply (not shown). A conductive mesh 34, preferably located between lens 22 and housing 16, covers the aperture 20 in housing 16. As described below, the conductive mesh 34 functions as an RF shield for substantially blocking RF emissions from the lamp assembly.

In the example shown in FIGS. 1–5, the lamp assembly 10 has an elongated configuration designed for use as a stop light in a sport-utility vehicle or other vehicle. In this example, the lamp assembly 10 has overall length of about 22 inches and a width of about 1.75 inches. The neon lamp 12 emits light over its entire length between electrodes. It will be understood that the lamp assembly 10 can have other dimensions and form factors within the scope of the present invention.

The lamp housing 16 is preferably fabricated of a rigid, plastic material, such as polycarbonate. The cavity 14 in housing 16 extends between connectors 24 and 26 and has light reflecting interior surfaces 40 and 42 that are metalized with an electrical conductor, such as aluminum, to form a coating 43 that reflects light and is electrically conductive. The reflecting surfaces 40 and 42 are shaped to direct light emitted by neon lamp 12 through lens 22 in a desired pattern. In the example of FIGS. 1–5, reflecting surface 40 includes a curved portion and has a specularly reflective surface. Reflecting surface 42 is flat and has a matte finish. The housing 16 further includes outer portions 44 and 46 having upper surfaces 45 and 47, respectively, for contact with lens 22. The upper surfaces 45 and 47 are provided with a continuous groove 50 that surrounds the cavity 14 containing the neon lamp 12. A plurality of mounting bosses 54 may be provided on the bottom of housing 16. Each mounting boss 54 preferably has a generally cylindrical configuration with a central bore for receiving a threaded stud 56. In a preferred embodiment, the housing 16 is provided with three equally-spaced bosses 54 and studs 56 for mounting the lamp assembly 10 to a vehicle. It will be understood that different mounting arrangements can be utilized within the scope of the invention.

Figure 5:
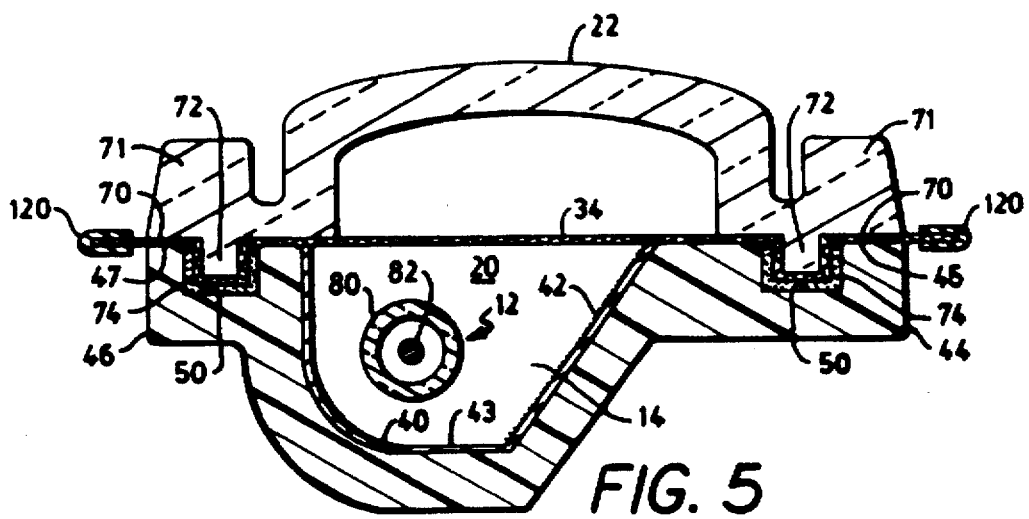
FIG. 5 is a cross-sectional view of the lamp assembly, taken along the line 5—5 of FIG. 3.

The housing 16 includes a flat surface 60, as best shown in FIGS. 2 and 5. A recess 62 is formed in surface 60 for receiving connector 26. The recess 62 is preferably semi-cylindrical in shape to receive a cylindrical lamp boot portion of connector 26, as described below. Preferably, a central axis 63 of the semi-cylindrical recess 62 is located such that the neon lamp 12 is positioned at or near the focus of reflecting surface 40. The semi-cylindrical recess 62 preferably has a diameter that is slightly larger than the outside diameter of connector 26, so that connector 26 fits securely and remains stationary within recess 62. An end wall 64 of recess 62 positions the neon lamp 12 axially within the lamp assembly 10. A hole 68 extends from the bottom of recess 62 to the exterior of lamp assembly 10 for passage of electrical lead 30 to the lamp power supply. The hole 68 in at least one end of the lamp assembly is preferably elongated to accommodate tolerances in the overall length of the neon lamp 12 and connectors 24 and 26, and to accommodate expansion and contraction of the components of the lamp assembly. The opposite end of housing 16 includes a similar flat surface with a semi-cylindrical recess for receiving connector 24.

An opening 66 extends from surface 60 through housing 16 to the external environment. The opening 66 can be used for leak testing of lamp assembly 10. Following leak testing, a plug is inserted in opening 66 to seal the interior of the lamp assembly.

The lens 22 covers the aperture 20 in housing 16 and transmits light emitted by neon lamp 12. The lens 22 is preferably fabricated of a light-transmitting plastic, such as polycarbonate, and is preferably red for use as a stop light on a vehicle. The lens 22 may include elements for directing the light emitted by neon lamp 12 in a desired pattern, as known in the art. The lens 22 includes an outer portion 71 having an outer peripheral surface 70 and a continuous ridge 72 for engaging groove 50 in housing 16. The lens 22 is preferably secured to housing 16 by an adhesive 74, such as epoxy, in groove 50. The lens 22 includes a downwardly-extending interior rib 76 near each end for retaining connectors 24 and 26 in the respective recesses 62 in housing 16.

The neon lamp 12 includes a glass lamp tube 80 having an electrode 82 mounted at each end. A preferred electrode 82 is disclosed in co-pending application Ser. No. 08/219,150, filed Mar. 29, 1994, which is hereby incorporated by reference. The electrode 82 is connected through a press seal 84 to an external contact pin 86. In a preferred embodiment, the lamp tube 80 has an overall length of 19.6 inches, not including the contact pins 86, and an outside diameter of 0.197 inch. A preferred fill material includes neon at a fill pressure of 100±15 Torr.

The neon lamp 12 is preferably operated at a frequency of 60 kHz and a voltage of about 1,000 volts. The required starting voltage is about 3,000 volts. It will be understood that neon lamps having different lengths and fill pressures will require different starting and operating voltages. Electrical energy for operation of neon lamp 12 is supplied to electrodes 82 through connectors 24 and 26.

Figure 4:
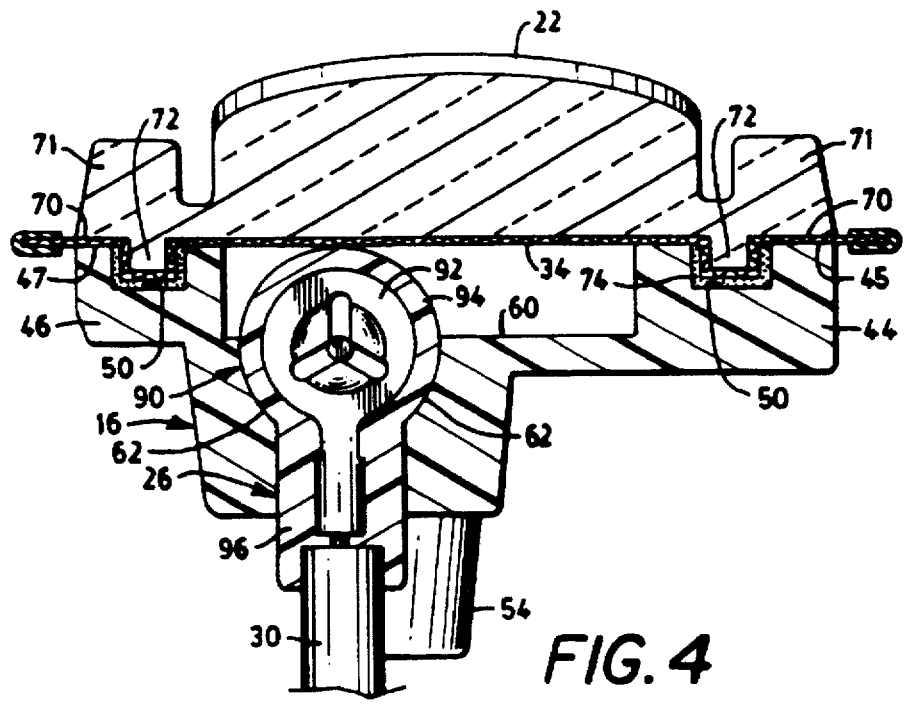
FIG. 4 is a cross-sectional view of the lamp assembly, taken along the line 4—4 of FIG. 3.

The connector 26 is shown in detail in FIGS. 3 and 4. It will be understood that the connector 24 at the opposite end of the lamp assembly 10 has the same construction. The connector 26 includes an electrically-insulating, resilient boot 90, an electrical terminal 92 and electrical lead 30. The electrical terminal 92 and the electrical lead 30 together constitute an electrical conductor for supplying electrical energy to the neon lamp 12. The resilient boot 90 is preferably molded of a high temperature silicon rubber, such as G.E. Silicone, and includes a lamp boot portion 94 and a wire boot portion 96. In a preferred embodiment, the silicon rubber is substantially transparent to permit visual inspection of the electrical connections within the connector.

The lamp boot portion 94 has a generally cylindrical configuration with a cavity 98 for receiving the press seal 84 and contact pin 86 of neon lamp 12. The cavity 98 extends axially from one end of the lamp boot portion 94 and is preferably shaped to conform to the press seal 84, so that the connection between contact pin 86 and electrical terminal 92 is substantially sealed against entry of moisture and liquids. The resilient nature of the boot 90, as well as the internal shape of cavity 98, insures a seal between the lamp 12 and boot 90. The external surface of lamp boot portion 94 is generally cylindrical and is dimensioned to fit within recess 62 in housing 16. The outside dimension of lamp boot portion 94 is matched to the inside dimension of recess 62 so as to accurately locate the boot 90 and to prevent substantial movement of neon lamp 12 within the lamp assembly. The lamp boot portion 94 is retained in recess 62 by rib 76 on lens 22. The pressure applied by rib 76 on lamp boot portion 94 causes lamp boot portion 94 to seal hole 68 at the bottom of recess 62.

The wire boot portion 96 preferably extends from lamp boot portion 94 at a right angle through hole 68. The wire boot portion 96 encloses the connection between electrical lead 30 and electrical terminal 92, so as to substantially seal this connection against moisture and liquids. Preferably, the electrical lead 30 includes a coupling wire having silicon rubber insulation, so that the wire boot portion 96 of resilient boot 90 substantially seals around the silicon rubber insulation of electrical lead 30. The hole 68 in housing 16 is preferably filled with an adhesive for sealing the interior of the lamp assembly and for retaining the connector 26 in position.

The electrical terminal 92 and the end portion of electrical lead 30 connected to electrical terminal 92 are molded into resilient boot 90 to provide connector 26 with a permanently attached electrical lead 30. Each of electrical leads 28 and 30 is preferably provided with an in-line connector 100 (FIG. 1) for connection of lamp assembly 10 to the power supply for energizing neon lamp 12.

Figure 6:
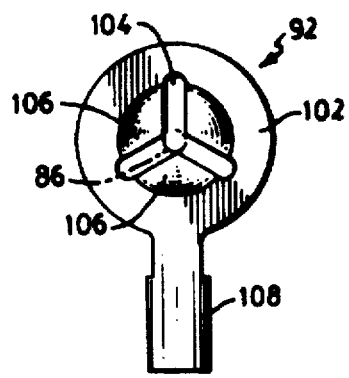
FIG. 6 is an enlarged front view of the electrical terminal used in the connectors of the lamp assembly.
Figure 7:
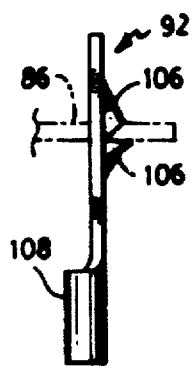
FIG. 7 is an enlarged side view of the electrical terminal shown in FIG. 6.

The electrical terminal 92, shown in FIGS. 6 and 7, preferably includes a generally flat circular portion 102 having three equally-spaced radial slots 104 which intersect at the center of circular portion 102 to define contact points 106. The three contact points 106 define a circle that is slightly smaller in diameter than the contact pin 86 of neon lamp 12. Thus, when the contact pin 86 is pushed through the opening between contact points 106, the contact points 106 are deformed and bear against contact pin 86 to provide a secure electrical contact. The electrical terminal 92 further includes a crimp portion 108 that extends from circular portion 102. The crimp portion 108 is crimped to the coupling wire of electrical lead 30 prior to molding into resilient boot 90.

The configuration of connectors 24 and 26 utilizing resilient boot 90 is highly advantageous in the structure and operation of the lamp assembly 10. The resilient boot 90 is dimensioned to provide a conformal, moisture-proof seal around the press seal 84 of neon lamp 12 and around the electrical lead 30. Thus, the electrical connections remain dry, even under high humidity and high precipitation conditions. In addition, the resilient boot 90 accurately locates the neon lamp 12 in housing 16. The lamp boot portion 94 in combination with the recess 62 positions the neon lamp 12 at the focus of reflecting surface 40, so that the light emitted by neon lamp 12 is directed by reflecting surface 40 through lens 22 in a desired pattern. Furthermore, the resilient boot 90 of each connector cushions the neon lamp 12 against shock and vibration. Moreover, the plastic housing 16 and the glass lamp tube 80 have different thermal expansion coefficients, which are magnified by the long lamp tube used in the lamp assembly. The resilient boot 90 acts as a flexible expansion and contraction joint.

The silicon rubber material of the resilient boot 90 is particularly advantageous in the lamp assembly 10. Temperatures on the order of 250° C. have been measured near the lamp electrodes at an ambient temperature of 80° F. Silicon rubber withstands this temperature without damage or degradation. Furthermore, silicon rubber does not outgas. The products of outgassing could potentially coat the lens 22, the lamp tube 80 or the reflecting surfaces 40 and 42 and reduce light output. In addition, the high dielectric strength of the silicon rubber is important in electrically isolating the voltages applied to the neon lamp 12 during starting and normal operation.

In the neon lamp 12, a high electric field is induced in the region of each electrode by the applied voltage. Since an AC voltage is applied to the lamp, the lamp acts as a dipole radiation source. To induce discharge in relatively high pressure lamps, relatively high voltages are needed. Also, relatively high voltages are required for inducing discharge in long lamps. As a result, high pressure, long lamps have a stronger induced dipole radiation. In the example described above, the neon lamp requires an operating voltage of about 1000 volts and a starting voltage of about 3000 volts. The dipole radiation is primarily at the fundamental frequency of lamp operation, typically 60 kHz. Due to resonances, plasma banding, and material induced delays, harmonics and frequency spreading occur. A 60 kHz neon lamp may emit radio frequency (RF) noise at 60 kHz±5 kHz; 120 kHz±20 kHz; 240 kHz±60 kHz; etc. In general, longer and more powerful lamps emit more RF noise.

The conductive mesh 34 reduces emission of RF noise by the lamp assembly 10 to within acceptable limits. The conductive mesh 34 is connected to a reference potential, such as ground, and substantially blocks RF energy, while transmitting a large percentage of the light emitted by neon lamp 12. As described above, the reflecting surfaces 40 and 42 may be formed as conductive coating 43 on housing 16. The conductive coating 43 is connected to the reference potential and provides back side shielding of RF energy emitted by the neon lamp 12. The conductive coating on surfaces 40 and 42 and the conductive mesh 34 together form an RF shield that encloses the neon lamp 12 and prevents substantial emission of RF energy. The RF radiation emitted by neon lamp 12 induces RF currents in conductive mesh 34. The RF currents are conducted to ground by the conductive mesh 34. It will be understood that RF radiation is substantially attenuated by the conductive mesh 34 but is not entirely eliminated.

In a preferred embodiment, the conductive mesh is retained between the lens 22 and housing 16. More particularly, the conductive mesh 34 is pushed by ridge 72 of lens 22 into groove 50 in housing 16 and is retained in position by the adhesive 74. The conductive mesh 34 does not degrade the attachment between lens 22 and housing 16, because the adhesive 74 passes through the openings in conductive mesh 34. Preferably, strips of adhesive tape 120 are provided along the long edges of conductive mesh 34 to prevent curling and other deformation of conductive mesh 34 prior to installation in the lamp assembly 10. The tape 120 and the edges of conductive mesh 34 can be left in place if they are not visible after final installation of the lamp assembly 10. Alternatively, the tape 120 and the edges of conductive mesh 34 can be trimmed around the periphery of housing 16.

In general, the conductive mesh 34 can be any mesh that provides both an acceptable level of light transmission and an acceptable level of RF shielding. It will be understood that the mesh selection is a tradeoff between light transmission and RF shielding. In a preferred embodiment, the conductive mesh 34 is formed as a grid of 0.001 inch diameter stainless steel wire, and the mesh includes 100 wires per inch along both x and y axes (100 mesh). This mesh provides approximately 77% light transmission and reduces RF emissions to within acceptable limits. A second example of a suitable conductive mesh 34 utilizes 0.001 inch diameter stainless steel wire in a grid having 80 wires per inch along both x and y axes (80 mesh). This mesh has approximately 82% light transmission.

Figure 8:
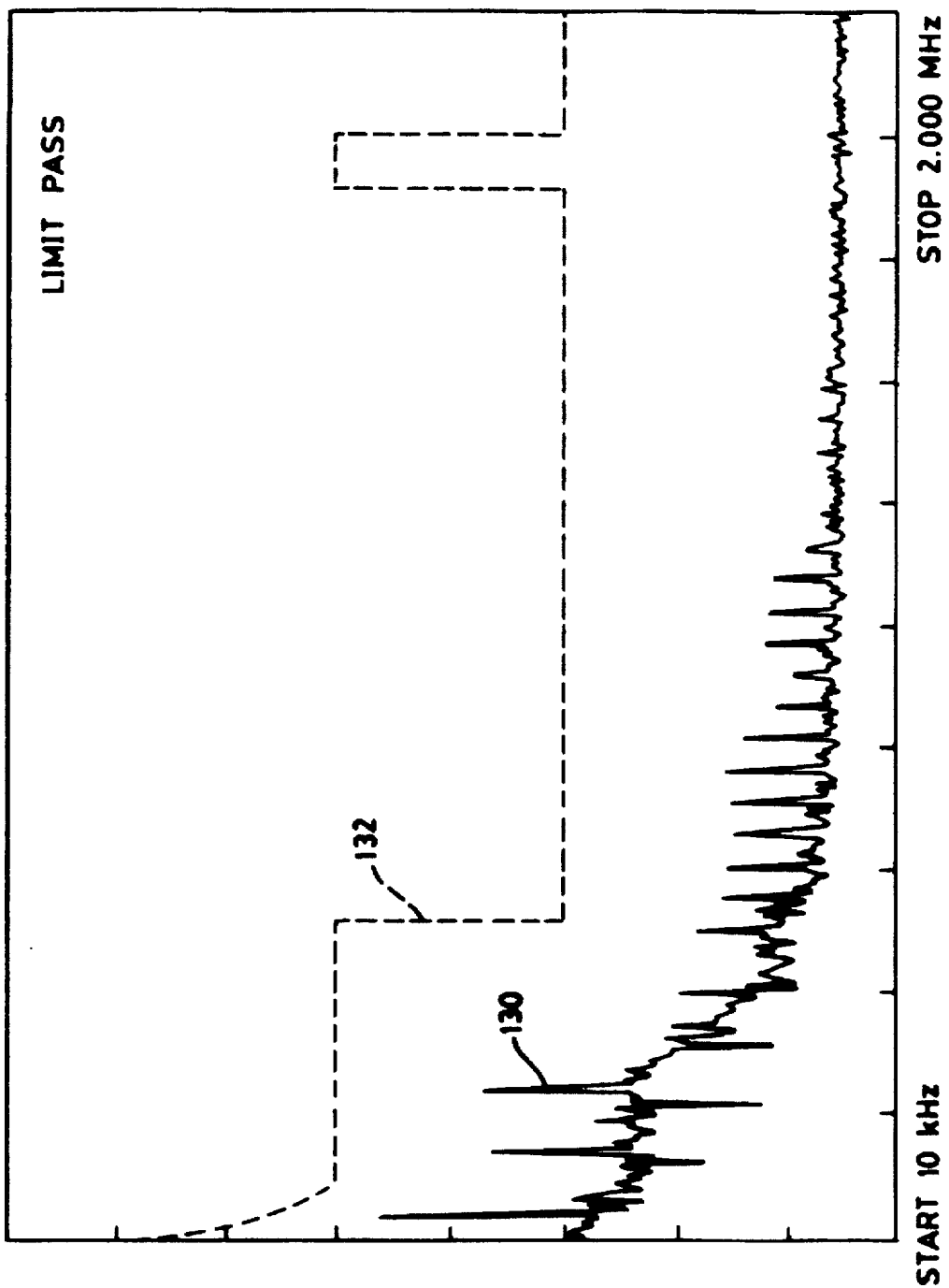
FIG. 8 is a graph of emitted RF intensity as a function of frequency for the lamp assembly of the present invention.

The RF shielding performance of the 100 mesh used in the lamp assembly of FIGS. 1–5 is illustrated in FIG. 8. Curve 130 represents emitted RF field strength as a function of frequency over a range of 10 kHz to 2.0 MHz. Curve 132 represents a specification for a maximum acceptable level of RF emission over the frequency range. As shown, the RF emission meets the specification over the entire frequency range, when the 100 mesh conductive mesh 34 was used. When the conductive mesh 34 was not used, the RF emissions were well in excess of the acceptable level.

As noted above, the conductive mesh 34 is electrically connected to a reference potential, such as ground, to achieve effective RF shielding. The ground connection must be short, secure and have low RF impedance for effective RF shielding. In general, this is achieved by electrically connecting the conductive mesh 34 to a reference potential, such as a chassis or a ground connection. When the lamp assembly 10 is used in a vehicle, the conductive mesh 34 is electrically connected to the vehicle chassis. In a preferred embodiment, the conductive mesh 34 is provided with an integral extension 124 of sufficient length for connection to ground. The integral extension 124 can, for example, have a width of about 2 inches and a length of about 3.5 inches. As shown in FIG. 3, the integral extension 124 of conductive mesh 34 may be secured over mounting stud 56 between chassis member 126 and boss 54. The chassis member 126 and the integral extension 124 of conductive mesh 34 are securely attached by a star nut 128. In addition, the conductive coatings on surfaces 40 and 42 are connected to ground via integral extension 124 of conductive mesh 34, because the housing 16 has a conductive coating over the portions which contact conductive mesh 34.

It will be understood that any suitable technique can be utilized for securely grounding conductive mesh 34. For example, a wire, conductive tape or other conductor can be retained between lens 22 and housing 16 in contact with conductive mesh 34. The wire, conductive tape or other conductor can be secured to mounting stud 56, as shown in FIG. 3, or can be connected to ground in any other desired manner. In another approach, a conductive member or spring member can extend internally of housing 16 from conductive mesh 34 to an external ground contact.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A gas discharge lamp assembly comprising:
    a housing including an interior cavity having a conductive, reflecting surface, a first sealing edge substantially encircling the cavity with the conductive reflecting surface extending onto the sealing edge, the housing further having an aperture for emission of light;
    an elongated, tubular, positive column gas discharge lamp mounted within the cavity in said housing for emission of light through said aperture;
    a light-transmissive lens covering the aperture in said housing, having a second sealing edge substantially co-extensive with the first sealing edge;
    electrical connectors for coupling electrical energy to said gas discharge lamp;
    a light-transmissive, conductive mesh with an integral extension, the conductive mesh covering the aperture in said housing, extending to be substantially co-extensive with the first sealing edge, and the second sealing edge, and in contact with the reflective, conductive sealing edge, the mesh being retained between said housing and said lens thereby forming with the reflective conductive surface an RF energy enclosure for the gas discharge lamp, substantially blocking RF energy emitted from said gas discharge lamp; the integral extension extending between the first sealing edge and the second sealing edge to the exterior of the housing to electrically connect the conductive mesh and said reflecting surface to a reference potential.

2. A gas discharge lamp assembly as defined in claim 1 wherein the first sealing edge, and the second sealing edge form therebetween, at least along a portion, a tongue and groove.

3. A gas discharge lamp assembly as defined in claim 2 wherein at least a portion of the conductive mesh is positioned between the tongue and the groove.

4. A gas discharge lamp assembly as defined in claim 3 wherein, and the integral extension extends through the tongue and groove to the exterior of the housing.

5. A gas discharge lamp assembly as defined in claim 4 wherein a glue is positioned to extend through the conductive mesh to bond the first sealing edge to the second sealing edge while entrapping the conducting mesh therebetween.

6. A neon gas discharge lamp assembly comprising:
    a housing including a cavity having an aperture for emission of light;
    a gas discharge lamp mounted within the cavity in said housing for emission of light through said aperture;
    conductors for coupling electrical energy to said neon gas discharge lamp;
    a light-transmissive, conductive mesh covering the aperture in said housing for substantially blocking emission of RF energy from said housing;
    the housing including a conductive portion which, together with said conductive mesh, substantially surrounds said neon lamp, and
    an electrical conductor for coupling said conductive mesh to a reference potential said conductive portion also being electrically connected to said reference potential.

7. A neon lamp assembly as defined in claim 6 further including a light-transmissive lens covering said aperture and said conductive mesh.

8. A neon lamp assembly as defined in claim 7 wherein said conductive mesh is retained between said housing said lens.

9. A neon lamp assembly as defined in claim 6 wherein said conductive portion comprises a conductive surface of said housing, said conductive surface at least in part comprising a reflective surface for directing light emitted by said neon lamp through said aperture.

10. A neon lamp assembly as defined in claim 6 wherein said conductive mesh has a mesh size selected to substantially block RF energy generated within said neon lamp.

11. A neon lamp assembly as defined in claim 10 wherein said conductive mesh comprises a grid of about 100 wires per inch in two perpendicular directions, said wires having diameters of about 0.001 inch.

12. A neon lamp assembly as defined in claim 6 wherein said electrical conductor comprises an integral extension of said conductive mesh external to said housing.

13. A neon lamp assembly as defined in claim 6 wherein said electrical conductor is retained between said housing and said lens and electrically contacts said conductive mesh.

14. A neon lamp assembly as defined in claim 6 wherein said electrical conductor extends internally of said housing between said conductive mesh and an external grounding contact.

15. A neon lamp assembly as defined in claim 6 wherein said electrical conductor extends externally of said housing between said conductive mesh and an external grounding contact.

16. A neon lamp assembly comprising:

a housing including a cavity having a conductive, reflecting surface and an aperture for emission of light;

an elongated, tubular neon lamp mounted within the cavity in said housing for emission of light through said aperture;

a light-transmissive lens covering the aperture in said housing;

electrical connectors for coupling electrical energy to said neon lamp;

a light-transmissive, conductive mesh covering the aperture in said housing and retained between said housing and said lens for substantially blocking RF energy emitted from said neon lamp; and an electrical conductor for connecting said conductive mesh and said reflecting surface to a reference potential.

17. A neon lamp assembly as defined in claim 16 wherein said conductive mesh has a mesh size selected to substantially block RF energy generated by said neon lamp.

18. A neon lamp assembly as defined in claim 17 wherein said conductive mesh comprises a grid of about 100 wires per inch in two perpendicular directions, said wires having diameters of about 0.001 inch.

19. A neon lamp assembly as defined in claim 16 wherein said electrical conductor comprises an integral extension of said conductive mesh external to said housing.

* * * * *